United States Patent
Cho

(10) Patent No.: US 10,119,828 B2
(45) Date of Patent: Nov. 6, 2018

(54) DEVICE, METHOD AND UPDATE SERVER FOR AUTOMATICALLY UPDATING NAVIGATION SYSTEM

(71) Applicant: HYUNDAI MNSOFT, INC., Seoul (KR)

(72) Inventor: Yong Chan Cho, Seoul (KR)

(73) Assignee: HYUNDAI MNSOFT, INC., Seoul (KR)

( * ) Notice: Subject to any disclaimer, the term of this patent is extended or adjusted under 35 U.S.C. 154(b) by 136 days.

(21) Appl. No.: 15/219,585

(22) Filed: Jul. 26, 2016

(65) Prior Publication Data

US 2016/0334239 A1     Nov. 17, 2016

Related U.S. Application Data

(63) Continuation of application No. PCT/KR2014/007051, filed on Jul. 31, 2014.

(30) Foreign Application Priority Data

Jan. 28, 2014  (KR) .................. 10-2014-0010394

(51) Int. Cl.
*G01C 21/32*     (2006.01)
*G09B 29/10*     (2006.01)
(Continued)

(52) U.S. Cl.
CPC ......... *G01C 21/3617* (2013.01); *G01C 21/32* (2013.01); *G08G 1/0969* (2013.01);
(Continued)

(58) Field of Classification Search
CPC .............. G01C 21/3617; G01C 21/32; G08G 1/096827; G08G 1/096844; G08G 1/0969; G09B 29/106; H04L 67/42
(Continued)

(56) References Cited

U.S. PATENT DOCUMENTS 6,381,533 B1 *   4/2002   Crane ................. G01C 21/32
                                                          340/988
7,103,796 B1 *   9/2006   Kekre ................. G06F 11/2064
                                                          714/5.1
(Continued)

FOREIGN PATENT DOCUMENTS

JP       2013156216       8/2013
KR       1020120000327    1/2012
(Continued)

OTHER PUBLICATIONS

English translation of KR20120000327, Accessed via Espacenet Feb. 2, 2018.*

*Primary Examiner* — Krishnan Ramesh
(74) *Attorney, Agent, or Firm* — Bacon & Thomas, PLLC

(57) ABSTRACT

An automatic navigation-system update device includes a storage unit including a first storage module and a second storage module each of which stores map data and map version information; a communication unit configured to transmit the map version information extracted from the storage unit to an update server and to receive, from the update server, differential data of map data based on a difference between the map version information and latest map version information; and a control unit. The control unit guides a route on the basis of the map data stored in the first storage module and to update the map data stored in the second storage module by reflecting the differential data.

10 Claims, 4 Drawing Sheets

(51) Int. Cl.
*H04L 29/06* (2006.01)
*G08G 1/0968* (2006.01)
*G08G 1/0969* (2006.01)
*G01C 21/36* (2006.01)

(52) U.S. Cl.
CPC . *G08G 1/096827* (2013.01); *G08G 1/096844* (2013.01); *G09B 29/106* (2013.01); *H04L 67/42* (2013.01)

(58) Field of Classification Search
USPC .......................................................... 701/533
See application file for complete search history.

(56) References Cited

U.S. PATENT DOCUMENTS

| | | | |
|---|---|---|---|
| 7,523,276 B1* | 4/2009 | Shankar | G06F 11/1451 707/999.202 |
| 7,707,372 B1* | 4/2010 | Kumar | G06F 11/2082 711/162 |
| 2003/0172316 A1* | 9/2003 | Tremblay | G06F 11/2082 714/6.23 |
| 2005/0256972 A1* | 11/2005 | Cochran | G06F 11/2071 709/245 |
| 2007/0126605 A1* | 6/2007 | Aleksic | G01C 21/32 340/995.14 |
| 2010/0063727 A1* | 3/2010 | Umezu | G01C 21/32 701/532 |
| 2011/0040478 A1* | 2/2011 | Rinscheid | G01C 21/3688 701/532 |
| 2011/0106431 A1* | 5/2011 | Tomobe | G01C 21/32 701/533 |
| 2011/0270798 A1* | 11/2011 | Nagasaka | G01C 21/32 707/609 |
| 2012/0065811 A1* | 3/2012 | Nakamura | G01C 21/30 701/1 |
| 2012/0221239 A1* | 8/2012 | Cooper | G01C 21/26 701/409 |
| 2013/0275371 A1* | 10/2013 | Chang | G06F 17/30345 707/609 |
| 2014/0289648 A1* | 9/2014 | Rowe | A63F 13/537 715/757 |
| 2015/0066366 A1* | 3/2015 | Pang | G01C 21/32 701/532 |
| 2016/0047658 A1* | 2/2016 | Nishide | G01C 21/32 701/532 |
| 2016/0231750 A1* | 8/2016 | Kawamata | G06Q 50/02 |
| 2016/0259814 A1* | 9/2016 | Mizoguchi | G06F 17/30241 |

FOREIGN PATENT DOCUMENTS

| | | |
|---|---|---|
| KR | 1020120039893 | 4/2012 |
| KR | 1020120079242 | 7/2012 |
| KR | 1020130115708 | 10/2013 |

* cited by examiner

DEVICE, METHOD AND UPDATE SERVER FOR AUTOMATICALLY UPDATING NAVIGATION SYSTEM

CROSS-REFERENCE TO RELATED APPLICATIONS

The present application is a continuation-in-part of International Patent Application No. PCT/KR2014/007051, filed on Jul. 31, 2014, which is based upon and claims the benefit of priority to Korean Patent Application No. 10-2014-0010394, filed on Jan. 28, 2014. The disclosures of the above-listed applications are hereby incorporated by reference herein in their entirety.

TECHNICAL FIELD

The present disclosure relates to a technique for automatically updating a navigation system in which the same navigation software and database are stored in two storage media so that the navigation system is operated on the basis of data stored in one of the storage media and the other storage medium is used to perform an update on a background during a driving process. More specifically, the present disclosure pertains to a device, a method and an update server for automatically updating a navigation system, which is configured to perform an update with electric power supplied from a power source (battery) even after an engine of a motor vehicle is stopped and which is configured to synchronize data versions stored in two storage media.

BACKGROUND ART

A navigation system refers to a device or a program which helps a user to find a road through map guidance. In general, the navigation system is mounted to a motor vehicle. The navigation system provides map position information to a user and notifies the user of a route or a shortest distance leading to a destination.

A navigation system available in recent years has various functions such as a road guide function, an MP3 player function, a video player function, a terrestrial DMB receiving function, a real-time-traffic-information providing function, a point-of-interest (POI) display function and the like.

In the navigation system, it is necessary to periodically or non-periodically update map database, point-of-interest information and the like. In the past, an update was performed by connecting a storage medium to a personal computer. However, in recent years, an update is performed using wireless communication.

As disclosed in Korean Patent Application Publication No. 2009-0006743, there is available a technique in which a time period of stoppage of navigation functions during a map data update is minimized by using a database which stores map data and an updated data storage unit which stores updated map data. However, this technique has a problem in that navigation functions need to be stopped in order to perform an update. Further, in the case where a diving distance is short, it is difficult to receive an update file and perform an update.

SUMMARY

In view of the above, it is an object of the present disclosure to provide a technique capable of performing an update of a navigation system without stopping an operation of the navigation system by storing the same navigation software and database in two storage media so that the navigation system is operated on the basis of data stored in one of the storage media and the other storage medium is used to perform an update on a background.

Another object of the present disclosure is to provide a technique capable of performing an update of a navigation system through the use of a power source even after an engine of a motor vehicle is stopped and capable of updating the navigation system with latest data even when the motor vehicle moves a short distance.

A further object of the present disclosure is to provide a technique capable of synchronizing data versions stored in two storage media and capable of, even when one of the two storage media is broken down, enabling a user to continuously operate the navigation system through the use of the other storage medium.

In accordance an aspect, there is provided an automatic navigation-system update device, including: a storage unit including a first storage module and a second storage module each of which stores map data and map version information; a communication unit configured to transmit the map version information extracted from the storage unit to an update server and to receive, from the update server, differential data of map data based on a difference between the map version information and latest map version information; and a control unit configured to guide a route on the basis of the map data stored in the first storage module and to update the map data stored in the second storage module by reflecting the differential data.

In accordance another aspect, there is provided an update server, including: a map storage module configured to store map data of a latest map version; a server communication unit configured to receive map version information and user authentication information from a navigation system and to transmit differential data of map data based on a difference between the map version information and the latest map version information to the navigation system which has been subjected to user authentication; a version management module configured to determine existence or non-existence of a map data version to update, based on the difference between the map version information and the latest map version information; a user authentication module configured to perform user authentication using the user authentication information; and a server control unit configured to, if it is determined by the version management module that the map data version to update exists, generate differential data of map data based on the difference between the map version information and the latest map version information.

In accordance still another aspect, there is provided an automatic navigation-system update method, including: a first step in which a control unit guides a route based on map data stored in a first storage module, extracts user authentication information and map version information stored in a second storage module and transmits the user authentication information and the map version information to an update server; a second step of receiving differential data based on a difference between the map version information and latest map version information from the update server via a communication unit; and a third step of updating the map data stored in the second storage module by reflecting the differential data.

According to such configurations, the changed latest map data are downloaded during the use of the navigation system. This provides an effect of enhancing the convenience of a user.

Furthermore, the update and the synchronization are performed even after an engine of a motor vehicle is turned off.

This provides an effect of relieving the burden of a user at the time when the update is performed by the user.

Moreover, a user who drives a motor vehicle only a short distance can download latest data and can update the navigation system with the latest data. This provides an effect of enhancing the convenience of the user.

In addition, even if one of the two storage media is broken down, it is possible to operate the navigation system through the use of the other storage medium. This provides an effect of enhancing the stability of the navigation system.

DETAILED DESCRIPTION OF EMBODIMENTS

Figure 1:
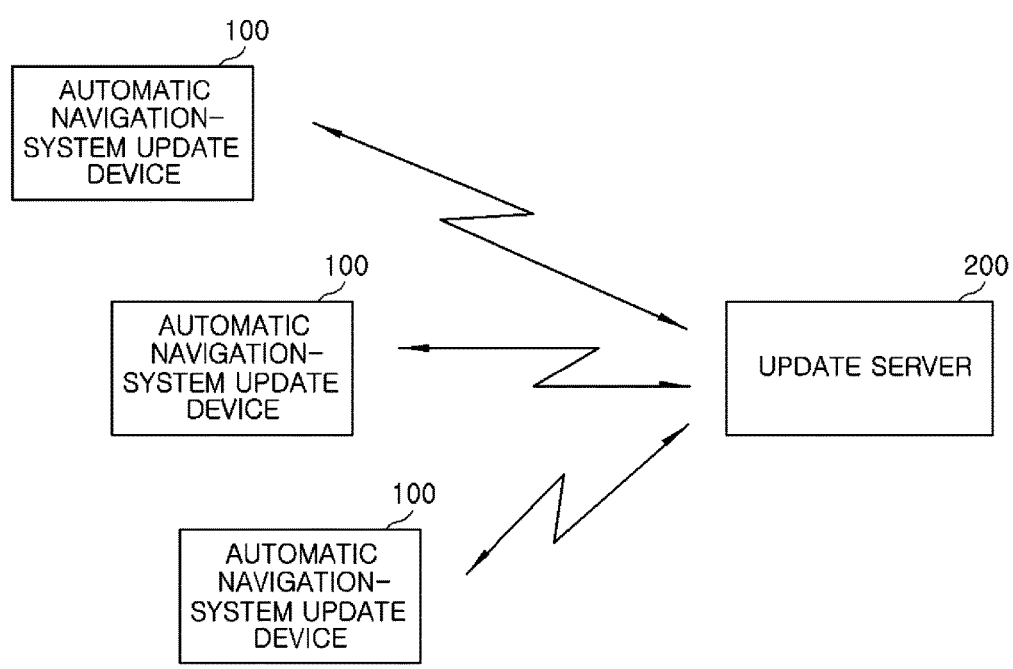
FIG. 1 is a configuration diagram of an update system according to an embodiment.

Terms or words used in the subject specification and the claims shall not be limitedly construed as typical or lexical meanings but shall be construed as meanings and concepts conforming to the technical ideas of the present disclosure, based on a principle that an inventor can appropriately define concepts of terms in order to describe his or her invention in a best way.

Accordingly, the embodiment described in the subject specification and illustrated in the drawings is nothing more than one preferred embodiment of the present disclosure and is not intended to represent all the technical ideas of the present disclosure. It should be understood that there may be many different equivalents and modifications that can replace the embodiment at the time of filing the subject application.

Embodiments of the present disclosure will now be described in detail with reference to the accompanying drawings.

FIG. 1 is a configuration diagram of an update system according to an embodiment of the present disclosure. As illustrated in FIG. 1, the system for automatically updating a navigation system includes an automatic navigation-system update device 100 which is operated to perform route guidance upon turning on an engine of a motor vehicle and which is configured to extract user authentication information and map version information and transmit the user authentication information and the map version information to an update server 200; and an update server 200 which is configured to receive the user authentication information and the map version information from the automatic navigation-system update device 100 to determine the existence or non-existence of a map version to update and which is configured to, if the map version to update exists, generate differential data and transmit the differential data to the automatic navigation-system update device 100.

Figure 2:
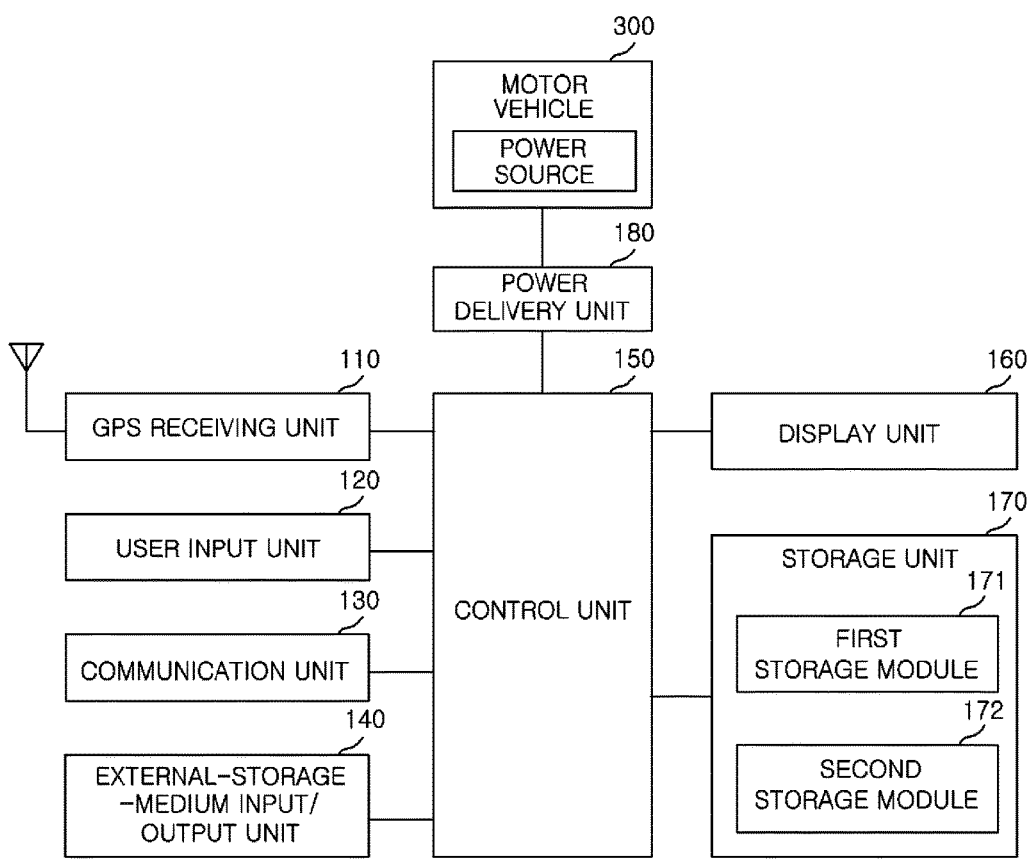
FIG. 2 is a configuration diagram of an automatic navigation-system update device according to an embodiment.

FIG. 2 is a configuration diagram of the automatic navigation-system update device according to an embodiment of the present disclosure. As illustrated in FIG. 2, the automatic navigation-system update device 100 includes a GPS receiving unit 110 configured to receive GPS position information, a user input unit 120 configured to enable a user to search for a destination and input a destination using a touch screen or a button, an external-storage-medium input/output unit 140 configured to accommodate an external storage medium such as a SD card or a USB memory capable of being directly connected to a personal computer to store update information, and a storage unit 170 including two or more storage modules of the same shape which store map data, user authentication information and map version information. In the present embodiment, the storage unit 170 may preferably include a first storage module 171 and a second storage module 172 and may be a nonvolatile memory card, a RAM or the like.

The automatic navigation-system update device 100 further includes a control unit 150 configured to extract the user authentication information and the map version information stored in the storage unit 170, to guide a route based on the map data stored in the first storage module 171 and to update the second storage module 172 using the differential data, a communication unit 130 configured to transmit the user authentication information and the map version information extracted from the storage unit 170 to the update server 200 and to receive the differential data from the update server 200, a display unit 160 configured to display latest road guidance information, and a power delivery unit 180 configured to receive electric power from a power source (battery) of a motor vehicle and 300 to deliver the electric power. For example, the control unit 150 may be a microprocessor, the communication unit 130 may be an antenna, and the power delivery unit 180 may be a relay.

Object data on a route for road guidance include road data, background data, POI (point of interest) data and the like. The objective data have respective attribute data. For example, the road data have a road shape and running information; the background data have building information, facility information and POI information; and the POI data have indexes for searching and detailed information of POI. Such object data have their own IDs (e.g., road 1, road 2, . . . road N; background 1, background 2, . . . background N; POI 1, POI 2, . . . POI N).

When the map data is updated, an object data of new information is added, the previous object data is deleted and/or the object attribute data is updated. In other words, when the map data is updated, object data ID is added and/or deleted, or the attribute data is updated while maintaining the object ID.

Differential data and differential data list can be created for each version by using the object data IDs which have been added, deleted or subjected to the change of attribute information thereof in the process of creating the map.

Since the update server 200 transmits the differential data and the differential data list to the automatic navigation-system update device 100, it is possible for the automatic navigation-system update device 100 to perform an update using the differential data.

A process of generating differential data according to the present embodiment is as follows.

It is assumed that the map version of the automatic navigation-system update device 100 is V3 and the latest map version of the update server 200 is V6.

The automatic navigation-system update device 100 transmits its own authentication information and the map version information V3 to the update server 200. After going through user authentication, the update server 200 generates and stores differential data on a version-by-version basis by comparing the latest map version V6 stored in a sever storage unit 230 with the map version V3 of the automatic navigation-system update device 100.

Then, the update server 200 generates a version list of differential data. Thereafter, the update server 200 transmits a differential data version list, which is to be downloaded by the automatic navigation-system update device 100, to the automatic navigation-system update device 100.

Specifically, assuming that the map version of the automatic navigation-system update device 100 is V3 and that the latest map version of the update server 200 is V6, the update server 200 generates differential data between V3 and V4, differential data between V4 and V5 and differential data between V5 and V6. The update server 200 transmits a differential data list for V4, V5 and V6 to the automatic navigation-system update device 100.

For example, the differential data between V3 and V4 may include addition of road 11, addition of background 11, deletion of POI 1 and change in the attribute data of road 1; the differential data between V4 and V5 may include addition of road 11, addition of background 12, deletion of road 2 and change in the attribute data of POI 2; and the differential data between V5 and V6 may include addition of road 13, addition of background 13, deletion of road 3 and change in the attribute data of road 1.

Thereafter, the automatic navigation-system update device 100 confirms the differential data corresponding to the differential data list received from the update server 200. Then, the automatic navigation-system update device 100 requests the update server 200 to transmit the differential data. By receiving the differential data, the automatic navigation-system update device 100 performs an update.

Additionally, the update server 200 or the navigation system may calculate or estimate the time required to update the map data through the automatic navigation-system update device 100 by using the amount of the differential data between the map versions.

A process of updating and synchronizing differential data according to the present embodiment is as follows.

In the present embodiment, the differential data of the map data are updated and synchronized using a power source (battery) under different situations including a case where a motor vehicle is under a driving process and a case where an engine of a motor vehicle is turned off. Hereinafter, a process of updating and synchronizing differential data under different situations will be described in detail.

First, when differential data are updated and synchronized in a state in which an engine of a motor vehicle is turned on, the control unit 150 of the automatic navigation-system update device 100 guides a route based on the map data stored in the first storage module 171. Thus, the control unit 150 performs an update with respect to the map data using the differential data received from the update server 200 and stored in the second storage module 172.

Specifically, the control unit 150 may copy all the updated map data of the second storage module 172 into the first storage module 171 to synchronize the map data of the first storage module 171. Alternatively, the control unit 150 may copy only the differential data stored in the second storage module 172 into the first storage module 171 to update and synchronize the map data of the first storage module 171.

However, in order to apply the updated and synchronized map data, it is necessary to reboot the automatic navigation-system update device 100.

Accordingly, in the present embodiment, if it is determined through analysis of log data that a motor vehicle runs on a road along which the motor vehicle has already run a predetermined number of times or more or that an update is feasible prior to outputting a new guidance message, the map data of the first storage module 171 is updated and the automatic navigation-system update device 100 is rebooted.

In this regard, the predetermined number of times means the number of running times at which a driver feels the guidance of a navigation system unnecessary when a motor vehicle moves along the relevant route. The predetermined number of times may be set to a value selected by a user.

That is to say, when a motor vehicle runs on a road along which the motor vehicle has already run a predetermined number of times or more, it is not necessary to provide route guidance to a driver. Thus, the map data of the first storage module 171 is updated and the automatic navigation-system update device 100 is rebooted.

In addition, when a motor vehicle runs on a highway, the amount of guidance information is small and the number of guidance messages to be outputted is reduced. Accordingly, in the present embodiment, if an update can be performed prior to outputting a new guidance message, the map data of the first storage module 171 may be updated and the automatic navigation-system update device 100 may be rebooted.

However, the present embodiment is not limited thereto. A message for guiding a user to determine whether to perform synchronization may be outputted. Upon receiving a user's approval, the map data of the first storage module 171 may be updated.

Secondly, when differential data is updated and synchronized in a state in which an engine of a motor vehicle is turned off, the automatic navigation-system update device 100 performs an update of the map data using electric power supplied from a power source of the motor vehicle.

Specifically, if an engine of a motor vehicle is turned off while receiving differential data from the update server 200, the automatic navigation-system update device 100 may be supplied with electric power from a power source of the motor vehicle through the power delivery unit 180. This enables the second storage module 172 to completely receive differential data.

Then, the control unit 150 may copy all the map data of the second storage module 172 updated as a result of the reception of the differential data into the first storage module 171 to synchronize the map data of the first storage module 171. Alternatively, the control unit 150 may copy only the differential data stored in the second storage module 172 into the first storage module 171 to update and synchronize the map data of the first storage module 171.

Thirdly, there may be a case where, after the differential data have been received by the second storage module 172 with an engine of a motor vehicle turned off, the engine of the motor vehicle is turned on prior to the completion of updating and synchronizing the first storage module 171.

In this case, the control unit 150 ceases to update and synchronize the first storage module 171 and operates the navigation system using the second storage module 172.

Thereafter, if the engine of the motor vehicle is turned off, the control unit 150 may copy all the updated map data of the second storage module 172 into the first storage module 171 to synchronize the map data of the first storage module 171. Alternatively, the control unit 150 may copy only the differential data stored in the second storage module 172 to the first storage module 171 to update and synchronize the map data of the first storage module 171.

In the case where the operation of the first storage module 171 is stopped due to the breakdown of the first storage module 171 required for the operation of the automatic navigation-system update device 100, the control unit 150 may guide a route based on the map data stored in the second storage module 172 performing an update.

At this time, in order to eliminate any inconsistency with the previous route guidance, the automatic navigation-system update device 100 is operated using the map data of the same version as the map version of the map data stored in the first storage module 171.

The storage module for driving the automatic navigation-system update device 100 and the storage module for performing the update may be differently used depending on the situation. In other words, the first storage module 171 may not be constantly used as a storage module for operating the automatic navigation-system update device 100. Depending on the situation, the second storage module 172 may be used as a storage module for operating the automatic navigation-system update device 100 and the first storage module 171 may be used as an update-purpose storage module.

Figure 3:
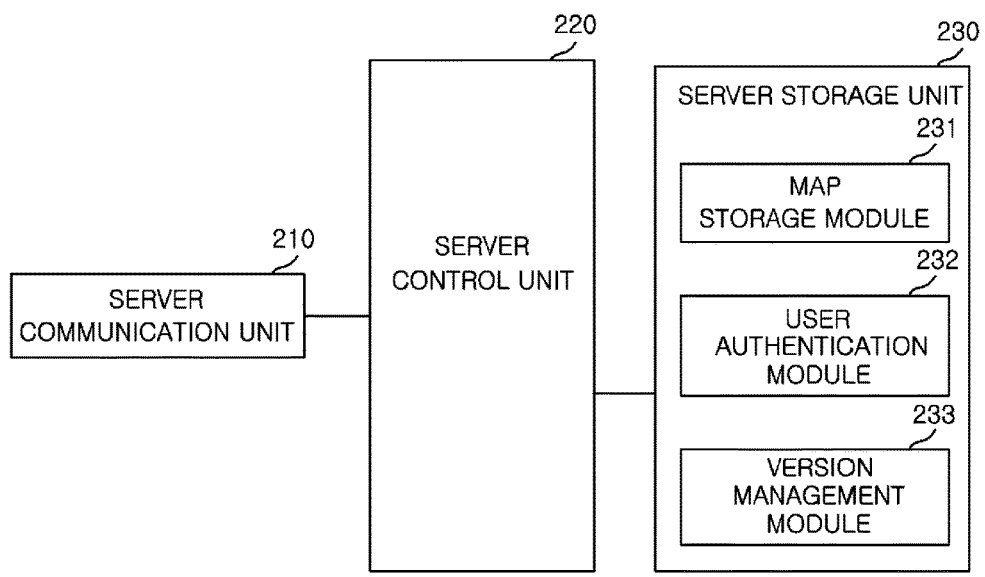
FIG. 3 is a configuration diagram of an update server according to an embodiment.

FIG. 3 is a configuration diagram of the update server according to an embodiment of the present disclosure. As illustrated in FIG. 3, the update server 200 includes a server communication unit 210, a server control unit 220 and a server storage unit 230.

Specifically, the server storage unit 230 includes a map storage module 231 configured to store map data of a latest map version, a user authentication module 232 configured to perform user authentication using user authentication information received from the automatic navigation-system update device 100, and a version management module 233 configured to determine the existence or non-existence of a map data version to update using the map version information received from the automatic navigation-system update device 100.

If it is determined by the version management module 233 that a map data version to update exists, the server control unit 220 generates differential data based on a difference between the map version information received from the automatic navigation-system update device 100 and the latest map version stored in the server storage unit 230. The server communication unit 210 receives user authentication information and map version information from the automatic navigation-system update device 100 and transmits the differential data generated in the server control unit 220 to the automatic navigation-system update device 100.

Figure 4:
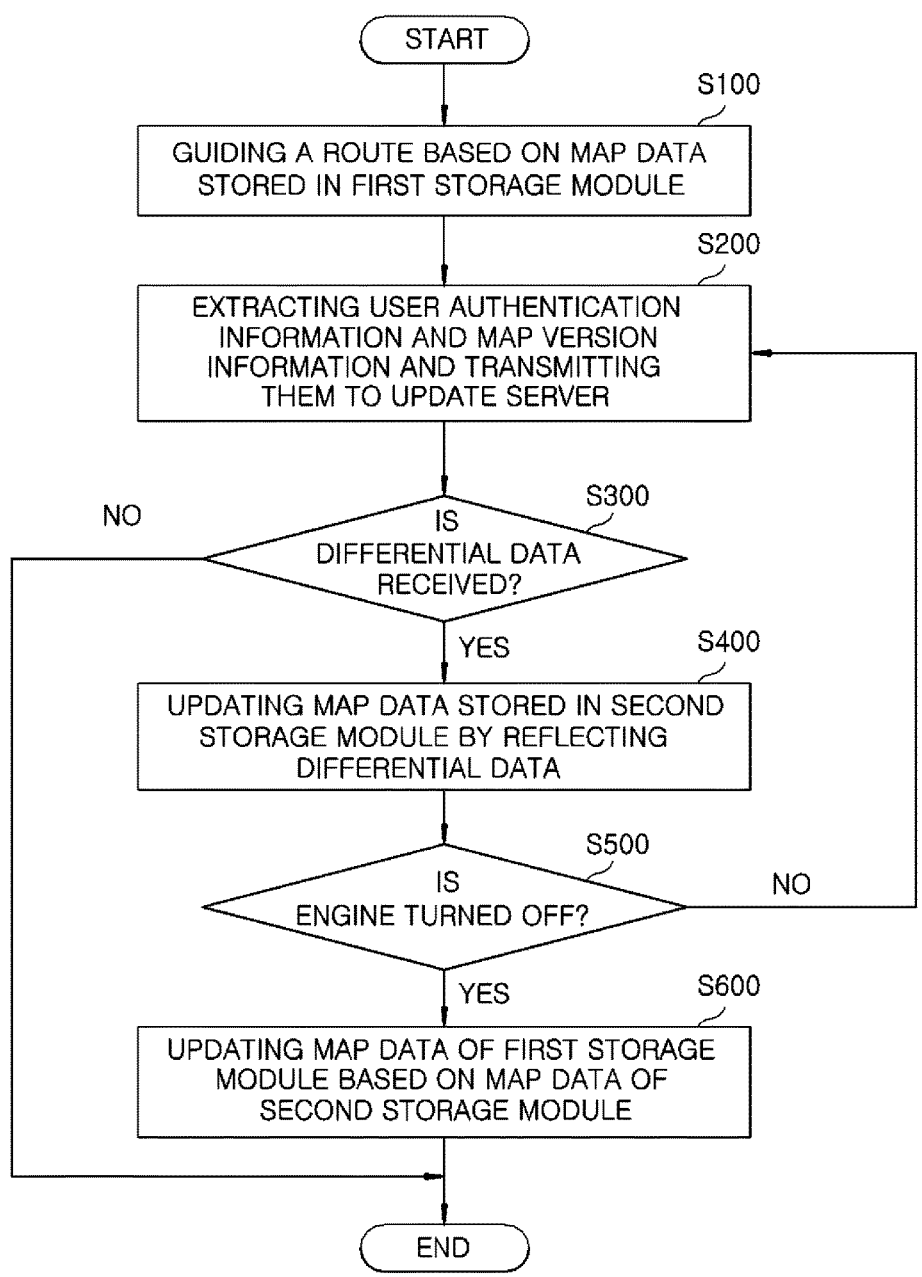
FIG. 4 is a flowchart illustrating a process of automatically updating map information according to an embodiment.

FIG. 4 is a flowchart illustrating a process of automatically updating map information according to an embodiment of the present disclosure.

A method of automatically updating the amp information of the automatic navigation-system update device 100 will be described with reference to FIG. 4. First, the control unit 150 guides a route based on the map data stored in the first storage module 171 (S100). The control unit 150 extracts the user authentication information and the map version information stored in the second storage module 172 and transmits the user authentication information and the map version information to the update server 200 through the communication unit 130 (S200).

Subsequently, if the currently-used map version differs from the latest map version of the update server 200, the control unit 150 receives differential data from the update server 200 (S300) and updates the map data stored in the second storage module 172 based on the differential data thus received (S400).

Then, if the update is finished, the control unit 150 determines whether or not an engine of a motor vehicle is turned off (S500). Unless the engine of the motor vehicle is turned off, the control unit 150 repeatedly performs steps S200 and S300 of extracting the user authentication information and the current map version information, transmitting the user authentication information and the current map version information to the update server 200 and receiving the latest map data.

On the other hand, if the engine of the motor vehicle is turned off, the control unit 150 updates the map data of the first storage module 171 based on the map data of the second storage module 172 (S600), thereby synchronizing the map data versions of the first storage module 171 and the second storage module 172.

There may be a case where the engine of the motor vehicle is turned off before the differential data is completely received in step S300.

In this case, according to the present embodiment, the control unit 150 completely performs the update of the differential data with respect to the second storage module 172 using the electric power supplied from a power source of the motor vehicle after the engine of the motor vehicle is turned off. The control unit 150 may copy all the updated map data of the second storage module 172 into the first storage module 171 to synchronize the map data of the first storage module 171. Alternatively, the control unit 150 may copy only the differential data stored in the second storage module 172 into the first storage module 171 to update and synchronize the map data of the first storage module 171.

There may be generated a case where the engine of the motor vehicle is turned on while updating the map data of the first storage module 171 based on the differential data of the second storage module 172 in step S600.

In this case, according to the present embodiment, the control unit 150 initially operates the automatic navigation-system update device 100 using the second storage module 172 which has been updated with the latest map version. Thereafter, if the engine of the motor vehicle is turned off again, the control unit 150 may copy all the map data of the second storage module 172 into the first storage module 171 to synchronize the map data of the first storage module 171. Alternatively, the control unit 150 may copy only the differential data stored in the second storage module 172 into the first storage module 171 to update and synchronize the map data of the first storage module 171.

In addition, if the operation of the first storage module 171 is stopped due to the breakdown of the first storage module 171 required for the operation of the automatic navigation-system update device 100, the control unit 150 may guide a route based on the map data stored in the second storage module 172 performing an update.

At this time, in order to eliminate any inconsistency with the previous route guidance, the automatic navigation-system update device 100 is operated using the map data of the same version as the map version of the map data stored in the first storage module 171.

In the aforementioned embodiment, there has been described an example in which the automatic navigation-system update device 100 is operated using the first storage module 171 and the map data are updated using the second storage module 172. However, the present disclosure is not limited to the aforementioned embodiment. The storage module for operating the automatic navigation-system update device 100 and the storage module for performing the update may be changed depending on the situation.

In other words, the first storage module 171 may not be always used as a storage module for operating the automatic navigation-system update device 100. Depending on the situation, the second storage module 172 may be used as a storage module for operating the automatic navigation-system update device 100 and the first storage module 171 may be used as an update-purpose storage module.

While the embodiments of the present disclosure have been illustrated and described above, the present disclosure is not limited to the aforementioned embodiments. A person having an ordinary knowledge in the art to which the present disclosure pertains will be able to make different modifications and changes without departing from the spirit of the present disclosure.

What is claimed is:

1. An automatic navigation-system update device, comprising:
a storage unit including a first storage module and a second storage module each of which stores map data and map version information, wherein the map data of the first storage module and the map data of the second storage module are initially identical to each other;
a communication unit configured to transmit the map version information extracted from the storage unit to an update server and to receive, from the update server, differential data of map data based on a difference between the map version information and latest map version information; and
a control unit configured to guide a route on the basis of the map data stored in the first storage module and to update the map data stored in the second storage module by reflecting the differential data, and the control unit further configured to copy all the updated map data of the second storage module into the first storage module to synchronize the map data of the first storage module or copy the differential data stored in the second storage module into the first storage module to update and synchronize the map data of the first storage module,
wherein the control unit guides the route only based on the map data stored in the second storage module when an operation of the first storage module is stopped.

2. The device of claim 1, further comprising:
a power delivery unit configured to deliver electric power received from a power source of a motor vehicle, and
wherein the storage unit, the communication unit and the control unit are configured to receive the electric power from the power source through the power delivery unit when an engine of the motor vehicle is turned off.

3. The device of claim 2, wherein the control unit is configured to update the map data of the first storage module based on the updated map data of the second storage module when the engine of the motor vehicle is turned off.

4. The device of claim 1, wherein when guiding the route based on the map data stored in the second storage module, the control unit is configured to guide the route using the map data of the same version as a map version of the map data stored in the first storage module.

5. The device of claim 1, wherein if it is determined through analysis of log data that a motor vehicle travels on a road along which a driver has driven a predetermined number of times or more, or it is determined through analysis of log data that the number of new guidance messages to be outputted is smaller than a predetermined number, the control unit updates the map data of the first storage module based on the updated map data of the second storage module immediately after updating the map data stored in the second storage module.

6. An automatic navigation-system update method, comprising:
a first step in which a control unit guides a route based on map data stored in a first storage module, extracts map data and map version information stored in a second storage module and transmits the map data and the map version information to an update server, wherein the map data of the first storage module and the map data of the second storage module are initially identical to each other;
a second step of receiving differential data based on a difference between the map version information and latest map version information from the update server via a communication unit;
a third step of updating the map data stored in the second storage module by reflecting the differential data;
a fourth step of copying all the updated map data of the second storage module into the first storage module to synchronize the map data of the first storage module or copying the differential data stored in the second storage module into the first storage module to update and synchronize the map data of the first storage module,
wherein the control unit guides the route only based on the map data stored in the second storage module when an operation of the first storage module is stopped.

7. The method of claim 6,
wherein, in the fourth step of, when an engine of a motor vehicle is turned off after the third step, electric power is received from a power source of the motor vehicle to update the map data of the first storage module based on the updated map data of the second storage module.

8. The method of claim 7, wherein if the engine of the motor vehicle is turned on before the first storage module is completely updated in the fourth step, the control unit guides the route based on the map data stored in the second storage module and updates the map data stored in the first storage module.

9. The method of claim 6, further comprising:
a step of receiving electric power from a power source of a motor vehicle if an engine of the motor vehicle is turned off in any of the first step, the second step and the third step.

10. The method of claim 6, wherein the third step includes, immediately after updating the map data stored in the second storage module, allowing the control unit to update the map data of the first storage module based on the updated map data of the second storage module if it is determined through analysis of log data that a motor vehicle travels on a road along which a driver has driven a predetermined number of times or more, or it is determined through analysis of log data that the number of new guidance messages to be outputted is smaller than a predetermined number.

* * * * *